Figure 1:
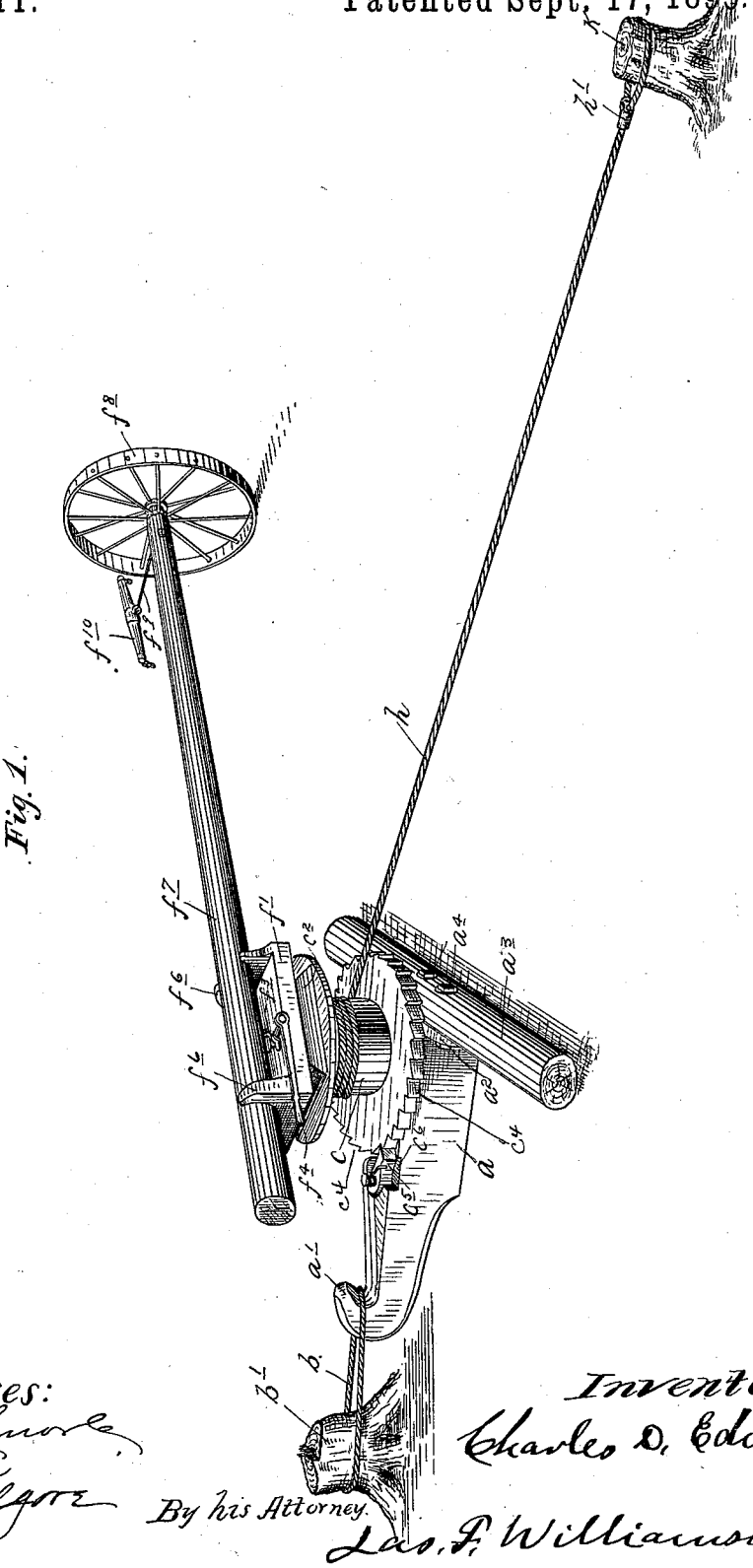

(No Model.)  2 Sheets—Sheet 1.
C. D. EDWARDS.
STUMP PULLER.

No. 546,511. Patented Sept. 17, 1895.

Witnesses:
E. F. Elmore
C. F. Kilgore

Inventor:
Charles D. Edwards
By his Attorney
Jas. F. Williamson.

(No Model.) 2 Sheets—Sheet 2.
C. D. EDWARDS.
STUMP PULLER.
No. 546,511. Patented Sept. 17, 1895.
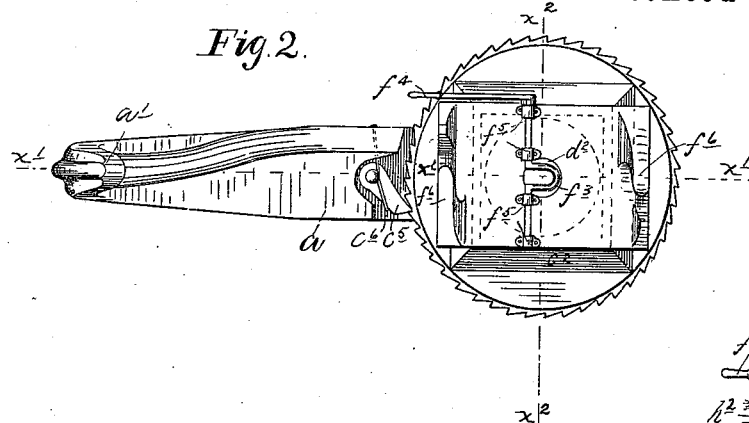
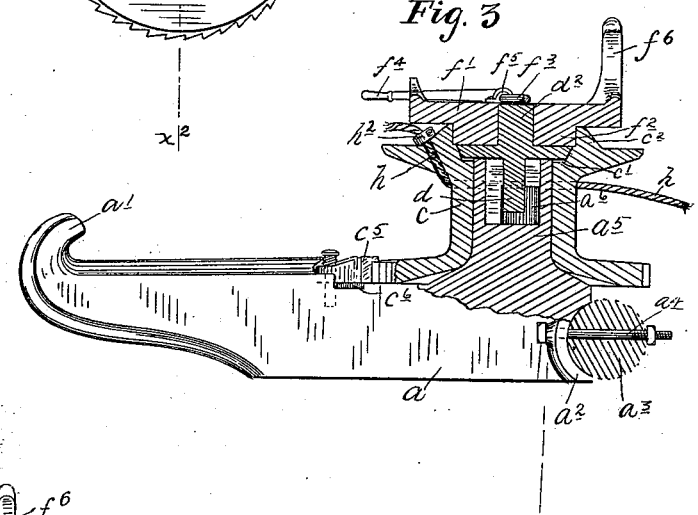
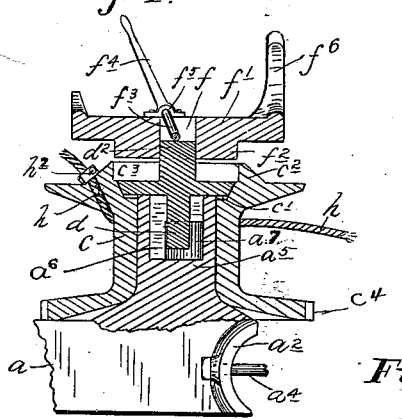
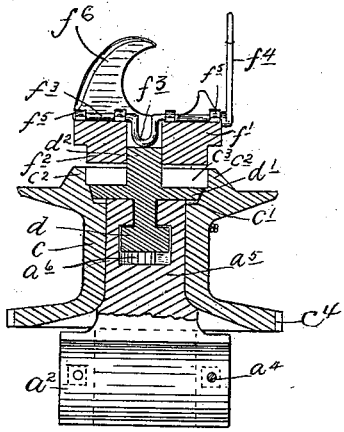
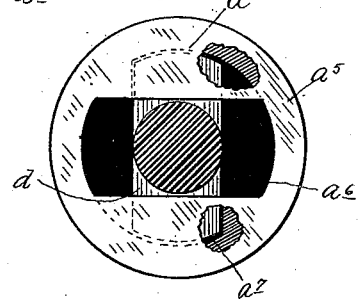
Witnesses:
E. F. Elmore
C. F. Kilgore
Inventor
Charles D. Edwards,
By his Attorney
Jas. F. Williamson.

UNITED STATES PATENT OFFICE.

CHARLES D. EDWARDS, OF ALBERT LEA, MINNESOTA.

STUMP-PULLER.

SPECIFICATION forming part of Letters Patent No. 546,511, dated September 17, 1895.

Application filed May 25, 1895. Serial No. 550,612. (No model.)

*To all whom it may concern:*

Be it known that I, CHARLES D. EDWARDS, a citizen of the United States, residing at Albert Lea, in the county of Freeborn and State of Minnesota, have invented certain new and useful Improvements in Stump-Pullers; and I do hereby declare the following to be a full, clear, and exact description of the invention, such as will enable others skilled in the art to which it appertains to make and use the same.

My invention relates to stump-pullers and other capstan-machines of the class wherein the capstan-drum is operated from a sweep pulled by horses or other animals, and has for its object to improve certain features of the construction, with a view of economy of first cost, convenience of manipulation, and efficiency in action.

To this end my invention consists of the novel features hereinafter described, and defined in the claims.

My invention is illustrated in the accompanying drawings, wherein like letters refer to like parts.

Figure 1 is a perspective view showing my improved machine as applied in use. Fig. 2 is a plan view of the same with some parts removed. Fig. 3 is a view of the parts shown in Fig. 2, partly in side elevation and partly in section, on the line $x'$ $x'$ of Fig. 2, with the sweep-head shown as in working engagement with the drum. Fig. 4 is a view similar to Fig. 3, with some parts broken away, showing the sweep-head raised out of engagement with the drum. Fig. 5 is a view, partly in end elevation, but chiefly in section, on the line $x^2$ $x^2$ of Fig. 2, looking from the right toward the left, with the parts in the same position as in Fig. 4; and Fig. 6 is a detail, partly in plan and partly in section, with some portions broken away, showing the key and key-seat for locking the drum to the pintle or post of the frame or base.

$a$ represents the permanent base or bed block of the machine, which terminates at its rearward end in a hook-like projection $a'$ for engagement with an anchor rope, chain, or cable $b$ to connect the same with a suitable anchor, such as a stump $b'$ or a strong stake driven into the ground for that purpose. At its forward end the bed block or base $a$ is provided with a laterally-extended concave flange $a^2$, which serves as a seat for a cross-timber $a^3$, which is secured thereto by bolts $a^4$. This cross piece or timber $a^3$ is of sufficient length for co-operation with the main frame or bed-block $a$ to give a stable support for the other parts of the machine. The concave flange or seat $a^2$ permits the application of a round timber or cross-piece $a^3$, which, of course, may be readily cut and applied from the green tree in the woods. Near its forward end the base or bed block $a$ is provided with an upright post or pintle $a^5$, which serves as a bearing for the capstan-drum $c$. The said post or pintle $a^5$ is recessed, as shown at $a^6$ and $a^7$ in Figs. 3 to 6, for the application of a key $d$ to hold the drum $c$ in working position on the post or pintle $a^5$. The part $a^6$ of this key-seat extends to the top of the pintle $a^5$ and is of a shape to receive the head of the key $d$, and the part $a^7$ of the said key-seat or recess is extended laterally from the part $a^6$, so as to permit the flange part of the key-head to be turned therein, as shown in Fig. 6, so as to lock the key and the drum to the pintle $a^5$. The key $d$ is provided with an annular flange $d'$ of greater diameter than the pintle $a^5$, and the drum head is rabbeted, as shown at $c'$, to form a shoulder or ledge, which underreaches the extended part of the key-flange $d'$. The pintle or post $a^5$ projects slightly above the ledge or shoulder $c'$ of the drum when the parts are in working position, so that the key-flange $d'$ will rest on the top of the pintle $a^5$ and the drum will turn clear of the said key-flange $d'$. The key $d$ has an upward central extension or stem-tip $d^2$, which is adapted to engage with a central hole or passage $f$ in a sweep-head $f'$. The key-tip $d^2$ is of circular form in cross-section, and the hole $f$ in the sweep-head $f'$ is of corresponding shape. The sweep-head $f'$ is provided below with a raised central portion $f^2$, which, as shown, is of rectangular form in cross-section. The drumhead is provided with vertical flanges $c^2$, which co-operate to form a rectangular seat $c^3$ for the part $f^2$ of the sweep-head $f'$. Hence the sweep-head, when in its lowermost position, may be made to interlock with the drumhead, as shown best in Fig. 3. The sweep-head has pivoted to its face or top a crank-shaft $f^3$, which has attached thereto at one end a hand-lever $f^4$. As shown, this crank-shaft is pivoted to the sweep-head by keepers $f^5$, and is so positioned that the crank portion of the said shaft will overlie the top of the key-tip $d^2$ and may be made to bear against the same as a fulcrum for raising the sweep-head from the position shown in Figs. 2 and 3 to the position shown in Figs. 4 and 5. The sweep-head $f'$ is provided with suitable rest-lugs $f^6$, of the ordinary form, for receiving the inner end of the sweep $f^7$, as shown in Fig. 1. The outer end of the sweep $f^7$ is supported by a wheel $f^8$, which is loose on the sweep.

$f^9 f^{10}$ represent a draw-rod and whiffletree, respectively, for the application of the draft animals.

The cable, chain, or rope $h$ for pulling the stumps has its inner end made fast to the drum and carries at its outer end a grab $h'$ of suitable form for engagement with the body of the rope without cutting the same after the loop has been made around the stump $k$ which is to be pulled. The inner end of the cable or rope $h$ is made fast to the drum by passing the same upward through a suitable hole in the top flange of the drum and attaching to the upper projecting end of the said rope a suitable clamp $h^2$, as shown in Figs. 3 and 4. The general action of this machine must be obvious from the foregoing description. Supposing the parts to be in position for pulling the stump $k$, as shown in Fig. 1, the sweep will be pulled by the draft-animal from the right toward the left, thereby turning the drum in the same direction and winding up the cable, chain, or rope $h$ onto the drum. The lower flange of the drum-head is provided with ratchet-teeth $c^4$, with which engages a spring-held locking pawl or dog $c^5$, which is pivoted to the main frame of bed-block $a$, as best shown in Figs. 1 and 2. Hence the drum will be held in whatever position it may be stopped. The said dog $c^5$ may be made to engage with a lock-notch $c^6$, when thrown outward, for holding the same in its idle position. After the stump has been pulled it is necessary, of course, to turn the drum backward for unwinding the cable $h$, and hence it is necessary either to disengage the sweep-head $f'$ from the drum $c$ or remove the sweep. I separate or disengage the sweep-head, and this is quickly done by means of the lever $f^4$ and the crank-shaft $f^3$. All that is necessary is to throw the lever $f^4$ from the position shown in Figs. 1, 2, and 3 into the position shown in Figs. 4 and 5, as by this action the sweep-head $f'$ will be carried upward out of engagement with the drum $c$ and be supported by the tip $d^2$ of the key $d$ and the crank-shaft $f^3$ of said lever device. The dog $c^5$ may then be thrown away from the ratchet $c^4$ into the lock-notch $c^6$ and the drum be turned backward into its initial position.

The advantage of this device for disengaging the sweep-head from the drum will be appreciated by all persons who are familiar with the actual fieldwork required from this class of machines. Without some such device much time would be lost in the removing and replacing of the sweep.

The part $f^2$ of the sweep-head $f'$ and the seat $c^3$ for the same in the drumhead have been shown as of rectangular form; but it will be understood, of course, that the said co-operating parts might be of any other angular form in cross-section which would permit the same to interlock when the sweep-head is in its lowermost position. The rectangular form is, however, convenient, inasmuch as engagement of said parts is always insured by a quarter-turn or less.

What I claim, and desire to secure by Letters Patent of the United States, is as follows:

1. In a stump puller, the combination, with a base having an upright post or pintle, provided with a key seat, of a capstan drum working on said pintle, and having in its upper end a sweep-head seat of angular form in cross section, a flanged key insertible into said key seat and engageable with said pintle to hold said drum in working position, and a sweep-head independent of the sweep and of angular form in cross section, engageable and disengageable with the seat for the same in the drum to lock together or separate the said sweep-head and drum, substantially as described.

2. In a stump puller, the combination with a base having an upright post or pintle, provided with a key-seat, of a capstan drum working on said pintle, a key engageable with said key-seat in the pintle and provided below its tip with a horizontal flange overreaching a part of the drum-head, a sweep-head seat on the top of the upper drum-head, a sweep-head having a central hole for the passage of the key tip and a body portion adapted to engage with said seat, to lock the sweep-head and drum together, and a lever device pivoted to the sweep-head and arranged to bear against the pintle tip as a base of resistance for raising the sweep-head out of engagement with the drum, substantially as described.

3. The combination with a frame $a$ $a'$ $a^2$ $a^3$ $a^4$ of the post or pintle $a^5$ having the key seat $a^6$ $a^7$, the drum $c$ $c'$ $c^2$ $c^3$, working on said pintle, the key $d$ $d'$ $d^2$ engageable with said key seat of the pintle, the sweep-head $f'$ $f^6$ having the hole $f$ for passing the key tip $d^2$, and the crank shaft $f^3$ pivoted to the sweep-head and having a hand lever $f^4$, all arranged and operating substantially as described.

In testimony whereof I affix my signature in presence of two witnesses.

CHARLES D. EDWARDS.

Witnesses:
HARRY JONES,
AUGUST PAULSON.